(12) United States Patent
Huffman et al.

(10) Patent No.: US 6,957,763 B2
(45) Date of Patent: *Oct. 25, 2005

(54) CONTAINER WITH RECLOSABLE FITMENT (75) Inventors: Todd H. Huffman, Richmond, VA (US); Christopher J. Parks, Ellicott City, MD (US); Christopher J. Hession, Richmond, VA (US); Jack Leong Hung Lum, Laurel, MD (US)

(73) Assignee: MeadWestvaco Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/680,904

(22) Filed: Oct. 8, 2003

(65) Prior Publication Data

US 2004/0069843 A1 Apr. 15, 2004

Related U.S. Application Data (63) Continuation of application No. 09/692,969, filed on Oct. 23, 2000, now Pat. No. 6,688,515.

(51) Int. Cl.⁷ .............................. B65D 5/54; B65D 5/72
(52) U.S. Cl. ............................ 229/125.08; 229/125.01; 229/216; 229/219; 229/237
(58) Field of Search ...................... 229/125.02, 125.03, 229/125.04, 125.08, 125.015, 125.13, 125.14, 125.15, 211, 216, 217, 219, 237, 240, 241, 242; 222/531, 541.6

(56) References Cited

U.S. PATENT DOCUMENTS

| | | |
|---|---|---|
| 2,108,431 A | 2/1938 | Cornwell |
| 2,448,819 A | 9/1948 | Mitchell |
| 2,967,010 A | 1/1961 | Caffey |
| 3,083,876 A | 4/1963 | Schneider |
| 3,105,591 A | 10/1963 | Ahlbor |
| 3,180,552 A | 4/1965 | Atkison |
| 3,265,282 A | 8/1966 | Maxwell |
| 3,606,133 A | 9/1971 | Meyers |
| 3,765,593 A | 10/1973 | D'Alessio |
| 4,239,150 A | 12/1980 | Schadowski |
| 4,421,236 A | 12/1983 | Lowe |
| 4,666,044 A | 5/1987 | Farber |
| 4,703,876 A | 11/1987 | Reil |
| 4,768,703 A | 9/1988 | Sosler |
| 5,101,999 A | 4/1992 | Robichaud |
| 5,306,533 A | 4/1994 | Robichaud |
| 5,911,359 A | 6/1999 | Stone et al. |
| 6,047,883 A | 4/2000 | Calvert et al. |
| 6,062,470 A | 5/2000 | Robichaud |
| 6,098,874 A | 8/2000 | Tokarski |
| 6,688,515 B1 * | 2/2004 | Huffman et al. ........ 229/125.08 |

* cited by examiner

*Primary Examiner*—Gary E. Elkins
(74) *Attorney, Agent, or Firm*—Thompson Hine LLP (57) ABSTRACT

A reclosable locking container and method for packaging dry materials, comprising a box formed from a foldable substrate and a molded reclosable, locking fitment, said fitment being lockable in the open or closed position. The container of the invention may be adapted to provide barrier packaging of materials to extend the shelf life thereof by incorporating a barrier material, fin seal closure elements and optionally a skived side seam, and a tearable perforated opening.

16 Claims, 6 Drawing Sheets

CONTAINER WITH RECLOSABLE FITMENT

This application is a continuation application of U.S. patent application Ser. No. 09/692,969 filed on Oct. 23, 2000, now U.S. Pat. No. 6,688,515.

FIELD OF THE INVENTION

The present invention relates to a rigid packaging container for dry or moist foods and other dry or semi-fluid materials, comprising a reclosable, locking, molded fitment device as a closure means. The closure means facilitates easy opening of the container, and can remain open unaided or may otherwise be locked in the open position for ease of removing the material, as in pouring. The closure means may also be locked in the closed position to prevent spillage of the material from within the container. The container may further be adapted as a barrier package for materials sensitive to light, oxygen and other gases while preventing the migration or destruction of flavor components and vitamins from within the container by incorporating a barrier material, fin seal closure elements in the box construction, and a tearable opening means formed by a series of laser cuts that do not penetrate the barrier material.

BACKGROUND OF THE INVENTION

In response to a need for a package with a reclosable opening, U.S. Pat. No. 3,104,591 (Ahlbor) describes a soft package for cigarettes or similar articles, which is designed to combine certain advantages of both a soft package and a rigid box. The body of the package is made of a thin wrapper or envelope blank. The soft package has a rectangular top end, which includes an adhesively attached cap made from a cap blank consisting of a more rigid material than the thin wrapper which forms the package body. According to the patent, the cap blank has incisions to form a lid opening when the cap is attached to the package body, and includes a fold line along the top of the opening that provides a hinged lid. The cap blank is secured, via adhesive zones, to the top end of the package so as to form a cap over half of the top end. The package body beneath the attached cap is perforated with tearing lines that allow the portion of the wrapper attached beneath the lid opening to be torn away and swung upwardly with the lid when it is opened. Although this patent recognized the need for a package with a reclosable opening, a need for a rigid container with a reclosable locking feature that was at the same time suitable for packaging delicate materials, such as flaky foods, remained evident in the art.

Rigid, reclosable paperboard containers suitable for packaging dry materials have more recently been developed for packaging food materials. For example, U.S. Pat. Nos. 3,765,593, 4,421,236, 4,768,703 and 5,911,359 disclose box containers having reclosable openings. U.S. Pat. No. 3,765,593 (D'Alessio) discloses a tubular cardboard carton having a diagonal flip-top structure that is formed from a single panel blank. The blank is cut and folded to form a front panel having a cutaway edge that is recessed from the edge of the upper end of the box, thereby forming an opening, and a rear panel having an extended tab portion contiguous with its side edge. When the panels are folded to form the carton, the extended tab portion of the rear panel folds over the edge of the opening in the front panel to form an integral side-hinged closure that covers the opening. This type of closure, however, cannot be locked to secure the opening and prevent spillage of the contents from the container, if, for example, the carton is inverted.

U.S. Pat. No. 4,421,236 (Lowe) discloses a carton for packaging cereals or other dry products, which is constructed from a blank having side and end closure flaps that are extensions of the front, rear and end panels of the blank. The reclosable opening is formed by imparting tear lines in a parallel spaced relationship to the upper edges of the front, rear and end panels, score lines in parallel spaced relationship to the tear lines, die cuts at the ends of each tear line, and further having a score line across the top portion, the combination of which integrally forms an upwardly pivotable flap. When the sealed carton is opened along the tear lines and folded back along the score line, the flap forms a pouring spout for dispensing of product from the carton. Lowe provides that the carton may also include a barrier coating or laminate that eliminates the need for a separate liner, and which maintains the freshness or integrity of the product stored in the carton. The disclosed closure means cannot be secured. Additionally, Lowe does not disclose or contemplate maintaining the integrity of the barrier coating or laminate in the unopened carton, since the tear lines in such cartons typically penetrate and therefore compromise the barrier coating or laminate material.

U.S. Pat. No. 4,768,703 (Sosler) discloses a carton having a top cover with a peripherally depending flange that is affixed to the open top end of the carton. Perforation lines around the periphery of the flange that penetrate through the flange as well as the front, rear and end panels of the carton, and a transverse score line in the top panel form a reclosable hinged cover and pour spout. The pour spout is closed by pulling the hinged cover downward over the open top end of the carton. A membrane liner may be separately heat sealed to the open top end of the carton before the top cover is attached. In this regard, after the carton is opened, the membrane liner portion may be pivoted upwardly and outwardly to dispense the carton contents, and the carton may be reclosed by pushing the membrane liner downward over the open top end then closing the hinged cover. Once the carton is opened by tearing along the perforations, it may be locked in open position by orienting the perforations in the flange so that they extend angularly from the opposing edges of the top panel to terminal flange edges in the unopened section of the cover. This closure means is not secure, however, and is susceptible to inadvertent opening and spillage of the carton contents if, for example, the carton is inverted. Moreover, the membrane liner does not provide full barrier protection to the package contents when it is unopened, since the inside of the carton is not completely sealed.

U.S. Pat. No. 5,911,359 (Stone) discloses a one-piece, flip-top carton with a lid formed from the combination of a perforation oriented parallel to the top edge of one end panel, obliquely oriented perforations along the front and rear panels, and at least one horizontal fold line across the closed top end. The carton blank is shaped to include a tabbed portion that, when folded, forms the flip top. This type of closure does not provide secure fastening means. The patent neither mentions nor suggests a means of dealing with the problem of deterioration of the package contents due to exposure to air and moisture.

None of the foregoing references addresses the problem of protecting the contents of the sealed container from exposure to light, oxygen or moisture vapor before it is opened. Other patents, however, have attempted to provide such barrier packaging. U.S. Pat. No. 4,239,150 (Schadowski) discloses a folding carton for leak-proof packaging of liquids having a skived side seam formed by shaving one side of the seam to form a tapered wedge. The wedge is then overlapped beneath the thicker, untapered portion of the seam to form a joint that is then bonded or sealed. The patent mentions that the seam so formed provides high liquid tightness even when the lapped seam is of slight thickness. The carton disclosed by this patent does not include any features to provide hermetic barrier packaging of materials while providing ease of opening, and no mention is made of a reclosable closure.

U.S. Pat. No. 5,101,999 (Robichaud) discloses a closure mechanism for cartons used in liquid packaging, the closure having a base attachable to the top of the carton over a scored area consisting of a first and second perimeter cut, each of which may be serrated or perforated, to permit penetration of an outer polyethylene layer; and a series of half cuts and arc cuts circumscribing a middle cut, which are designed to produce "bomb bay" doors when the middle cut is depressed inward by a push-tab or button appended from the inside of the hinged lid of the closure mechanism. The carton may preferably be formed from a laminate having therein a barrier material that is maintained unbroken in advance of opening. The disadvantage of the disclosed closure means is that it does not permit easy opening, as considerable pressure must be exerted on the push-tab to puncture the middle cut and form the "bomb bay" doors, and the scored area forming the opening is not maintained external to the carton. Rather, the broken scored area is pushed inward and therefore it cannot be removed from the carton after it is opened. The carton opening so formed is not a completely unobstructed opening, and, as a result, this type of closure cannot efficiently be used to package a pourable non-liquid material.

Most recently, the need for an easy to open barrier carton suitable for packaging non-liquid materials was addressed by U.S. Pat. No. 6,047,883 (Calvert). Calvert describes a bagless barrier paperboard container having a locking, reclosable fitment closure affixed to the top panel in parallel relation to the front and rear panels. The inner contact surface of the container is coated with a polymeric coating that exhibits excellent moisture vapor, oxygen and flavor barrier characteristics. A disadvantage of the Calvert container, however, is that in order to provide easy opening, a peelable sealant closure must be applied to the top fin or gable seal to form an opening means, and the inclusion of this element may compromise the barrier properties.

Accordingly, there is a need evident in the art for a fairly rigid, product-protecting packaging container that can be manufactured with a locking, reclosable fitment or closure means for securing the container opening, whether such closure means is in an open or closed position, while providing excellent barrier properties prior to opening of the container.

SUMMARY OF THE INVENTION

These objectives are met by the present invention, which provides a locking reclosable container for packaging pourable non-liquid materials, and a means for packaging such materials. The term "non-liquid", as used herein means dry or moist non-fluid materials having varying levels of moisture without being of a liquid consistency. The container can be easily secured to prevent accidental spillage after it is opened. The locking means is provided by a molded fitment, which is mounted over a removable tearable opening at or near the top of the container. This molded fitment may be locked in the closed position and can, advantageously, remain open unaided or optionally be locked in the open position.

More specifically, the present invention provides a container and methods for providing barrier protection to a packaged non-liquid material, wherein the unopened container provides a hermetically sealed barrier against incursion by the external atmosphere, and blocks the entry of light, oxygen, moisture vapor or other gases, and the escape of flavor components, if such functions are required. This hermetically sealed container is achieved by the combination of several features. First, the container body is formed from a laminated substrate having, as at least one layer thereof, a barrier material that is impermeable to oxygen, moisture vapor or other gases. An additional factor in achieving the barrier protection is the construction of the container body, which is preferably formed using fin seals that are folded flat and sealed against the container body during the forming process, thereby forming a tighter, less gas-permeable seal. The container body is also preferably formed with a skived side seam; however, this element is optional and not required. In addition, the container body suitably includes one or more series of cuts to form an easily tearable and removable opening, while avoiding penetration of the barrier material. The container body having these features is fitted with a molded, reclosable locking fitment to secure the opening after the container has been opened. Such a container provides a high level of barrier protection without the need for a separate packaging means, such as a polymer-based bag, inside the container. Accordingly, the container of the invention is suitable for packaging pourable non-liquid materials, such as cereals, pet food or other materials requiring barrier protection, and, in particular, for packaging such materials without using conventional bag-in-box packages.

In one aspect, therefore, the invention comprises a stackable, bagless, reclosable packaging container, comprising a container body in the form of a rigid box, and further comprising a reclosable locking fitment, which is lockable in either the open or closed position. In this regard, the box may be formed from any rigid, foldable substrate, such as a paperboard, plastic or any combination thereof. The box is suitably formed by folding and sealing a pre-cut blank, which may be manufactured in bulk according to means well known in the art. Suitable substrates from which the blank may be constructed include coated or uncoated paperboard, which may include, as a component, bleached or unbleached pulp; and plastics such as polyolefins, polycarbonates, vinyl polymers, polyesters and acrylics; or any combination thereof. Representative of these types of substrates are solid bleached sulfate paperboard (SBS), clay-coated newsback (CCNB), coated solid unbleached sulfate (SUS), multi-ply folding box board or kraft paperboard. To provide the barrier properties that are a desired feature of the present invention, polymeric materials such as polyethylene, polypropylene, metallized polyester, ethylene vinyl alcohol (EVOH) copolymer, nylon, aluminum foil, or any combination thereof are suitably included in the substrate. The barrier material may be selected based on the type and level of barrier protection it contributes to the substrate, and its compatibility with the substrate. For example, the barrier material may be selected from the group consisting of metallized polyester, metallized polypropylene, metallized oriented polypropylene, polyvinylidene chloride (PVDC), ethylene vinyl alcohol (EVOH) copolymer, nylon and aluminum foil. The number, arrangement and placement of the layers may be modified depending on the desired results. It should additionally be recognized that the substrate might, in alternative embodiments, be comprised of a single layer of material that possesses barrier properties, without being laminated with any additional layers.

The laminated substrate may be formed by extrusion coating, extrusion lamination, adhesive lamination, dry lamination, solvent coating, aqueous coating or combinations thereof. For additional barrier properties, oxygen scavengers or other fillers or additives may be incorporated into one or more layers of the laminate. In certain situations it may be desirable to incorporate antioxidants such as BHT into one or more layers in order to take advantage of the positive effect this is known to have on the shelf life of certain packaged foods.

The barrier layer may also serve as the product contact layer within the container, or, optionally, an additional layer may be included in the substrate as the contact layer. The choice of the contact layer is also determined, in part, by the intended use of the container. For example, where the material to be packaged is of food grade, the contact layer is desirably formed from an approved food-grade material. The laminated substrate may also include one or more layers of other materials, such as tie layers, primer layers or adhesive layers, to increase the adhesion between the other layers.

An example of a suitable laminated substrate for forming a barrier container according to the invention is a 16-point SBS paperboard manufactured by Westvaco Corporation, which may be laminated together with one or more layers of polymeric or barrier-forming materials. The outer surface of the substrate, which forms the outside of the box, may be coated for printing, or it may be left uncoated, depending on the type of substrate used, and the intended application for the container. Conceivably, the inner surface of the substrate may also be modified to allow printing, depending on the desired application.

The blank may be scored with fold lines to provide front, rear and side panels and a sealable flange, which may optionally be skived, for forming a side seam. The blank is further suitably perforated with a series of cuts to form a tearable opening means. The term "perforated", as used herein, means the formation of a series of cuts of a predetermined size and configuration through at least part of the thickness of the substrate to form a tearable opening that provides easy access to the contents of the container. Preferably, the cuts penetrate one or more layers of the substrate so as to form a tear guide for easy opening and removal of the perforated area, but avoid penetrating the barrier material. Where barrier properties are not required, however, the cuts may perforate the entire thickness of the substrate. The cuts may be made by any suitable means for achieving the desired length depth and configuration. Preferably, where a barrier function is desired, the cuts are made using a laser-cutting means. For example, the substrate may be partially penetrated by light pulses from a 100–800 watt carbon dioxide laser, available, for example, from Laser Machining Inc., to produce tear-guiding cuts that do not compromise the barrier layer of the substrate. The dimensions and spatial orientation of the cuts have also been found to affect the strength of the perforated region and its burst resistance. Suitably, therefore, the laser-cut opening may be formed from linear, jagged or curvilinear cuts of equivalent length or alternating long and short lengths, or combinations thereof, any of which may be in staggered orientation to form a tearable opening.

Suitably, the container of the invention also comprises a molded reclosable locking fitment that includes a frame, configured in dimension and shape to be mounted over the tearable perforated opening, preferably at or near the top to allow for pouring out of the box contents; and an attached fitment lid. The fitment lid can be locked in the closed position, and can remain open without aid of the human hand or any external device, in the open position, in relation to the frame. In this regard, the fitment lid is able to remain open unaided and will not close while the contents of the container are being poured out. In certain preferred embodiments of the invention, for example where the fitment lid is a hinged device, this characteristic may be due, in part, to the fitment and the hinge elements thereof being molded in the open position. As a result, the positive tension that is exerted when the hinge is bent to close the fitment lid is released when the lid is opened, and consequently the lid independently remains in the open position. In one such preferred embodiment, the fitment lid is hingedly attached to the frame, and is of an angular configuration consistent with the shape of the box, such that when the fitment lid is closed, the symmetry of the box is maintained. In this regard, the containers of the invention may be efficiently stacked or boxed for shipment and storage.

The fitment suitably comprises one or more locking mechanisms, which permits the fitment lid to be held in place in either the open or closed position. In a preferred embodiment, such locking mechanisms are each formed from one or more tab elements and correspondingly placed slot elements, such tab elements being reversibly and lockably engaged with the correspondingly placed slot elements when the lid is in either the open or closed position. For example, the fitment may comprise a first locking means having a first tab element integrally formed with and appending outwardly from the lower edge of the frame in direct relation to a first slot element near the lower edge of the lid, to provide a closure means when the first slot element is lowered over the first tab element and pressure is applied to the lower lid edge. When pressure is applied, said first slot element lockably engages the first tab element, thereby securely closing the fitment lid.

Such a fitment also optionally comprises a second locking means having an integrally formed second tab element at the upper edge of the frame, positioned in corresponding relation to a second slot element that is approximately equidistantly placed along the hinged upper edge of the lid, such that when the fitment lid is closed, the second slot element is positioned parallel to the upper edge of the frame, directly above, but not engaging, the second tab element. This combination of the second tab element and second slot element further provides a locking means when the fitment lid is fully opened such that the top of the fitment lid is parallel and planar with the top of the box, to provide full engagement of the second tab element within the second slot element and thereby preventing movement of the fitment lid.

While the fitment should be of a type that is lockable in the closed position, and further is capable of remaining open unaided or is otherwise lockable in the open position, a range of suitable fitments may be employed. The fitment itself may be manufactured from any suitable material compatible with the materials to be packaged, which is resilient enough to provide repeated opening and closure of the container, and which, preferably, is also economical to produce. Useful materials for this purpose may be selected from a wide range of moldable resins that can be formed according to a suitable molding procedure, such as injection molding or thermoforming. For example, the fitment may be molded from a material such as polypropylene (PP), low-density polyethylene (LDPE), linear low-density polyethylene (LLDPE), high-density polyethylene (HDPE), polyester or polystyrene. The parameters required for such a molding process and for producing fitments of various dimensions may be readily determined by one of ordinary skill in the art.

Suitably, the packaging container of the invention comprises a container body in the form of a rigid box. The box is constructed of a laminated material comprising at least one layer of a barrier material, wherein the at least one layer of barrier material is not perforated, and further includes one or more fin seals and optionally a side seam that may be skived as the means of seam closure. The fin seals are tighter and less susceptible to air and moisture vapor permeation than other conventionally known seals, such as gable seals, and, in this regard, the barrier properties of the packaging container are improved. Fin seals may secure any of the top, bottom or sides of the box. Preferably, top and bottom fin seals are formed in combination with an overlapped side seam that is advantageously skived to form a tighter seal. The combination of the top and bottom fin seals and the skived side seam, in addition to the unperforated barrier material present in the substrate, form a hermetically sealed container that is also easy to open, and which is therefore highly effective for barrier packaging applications.

Notwithstanding the foregoing description, it is to be understood that in a broader aspect the container of the invention comprises a box made of a substrate that may not necessarily possess barrier properties, but which includes a molded reclosable locking fitment having at least one locking means and any combination of fin seals, a skived side seam and a removable perforated opening.

In yet another aspect, the invention comprises a method of packaging materials that are susceptible to light, oxygen, moisture vapor or other gases to extend the shelf life thereof, comprising: forming a box from a laminated substrate having at least one layer of a barrier material in a process comprising cutting a blank from the laminated substrate; scoring said blank with fold lines to form front, rear and side panels and a flange; laser-cutting a series of cuts to form a tearable perforated opening on the surface of the blank, wherein the cuts do not penetrate the barrier material; folding the blank along said fold lines, optionally skiving the flange and affixing the outer surface of the flange to the inner surface of the rear panel to form a side seam; and fin sealing one end of the package to form a box; filling the box with a non-liquid material requiring protection from light, oxygen or moisture vapor; fin-sealing the other end of the box; and affixing a reclosable locking fitment over the tearable perforated opening.

DETAILED DESCRIPTION OF THE INVENTION

The packaging container of the present invention preferably is in the form of a bagless box having attached thereto a reclosable locking fitment. The box is formed by folding, according to conventional means, a blank that has been cut from a suitable substrate. The dimensions of the blank may be varied depending on the desired size of the packaging container and the nature of the material to be contained therein.

Figure 1:
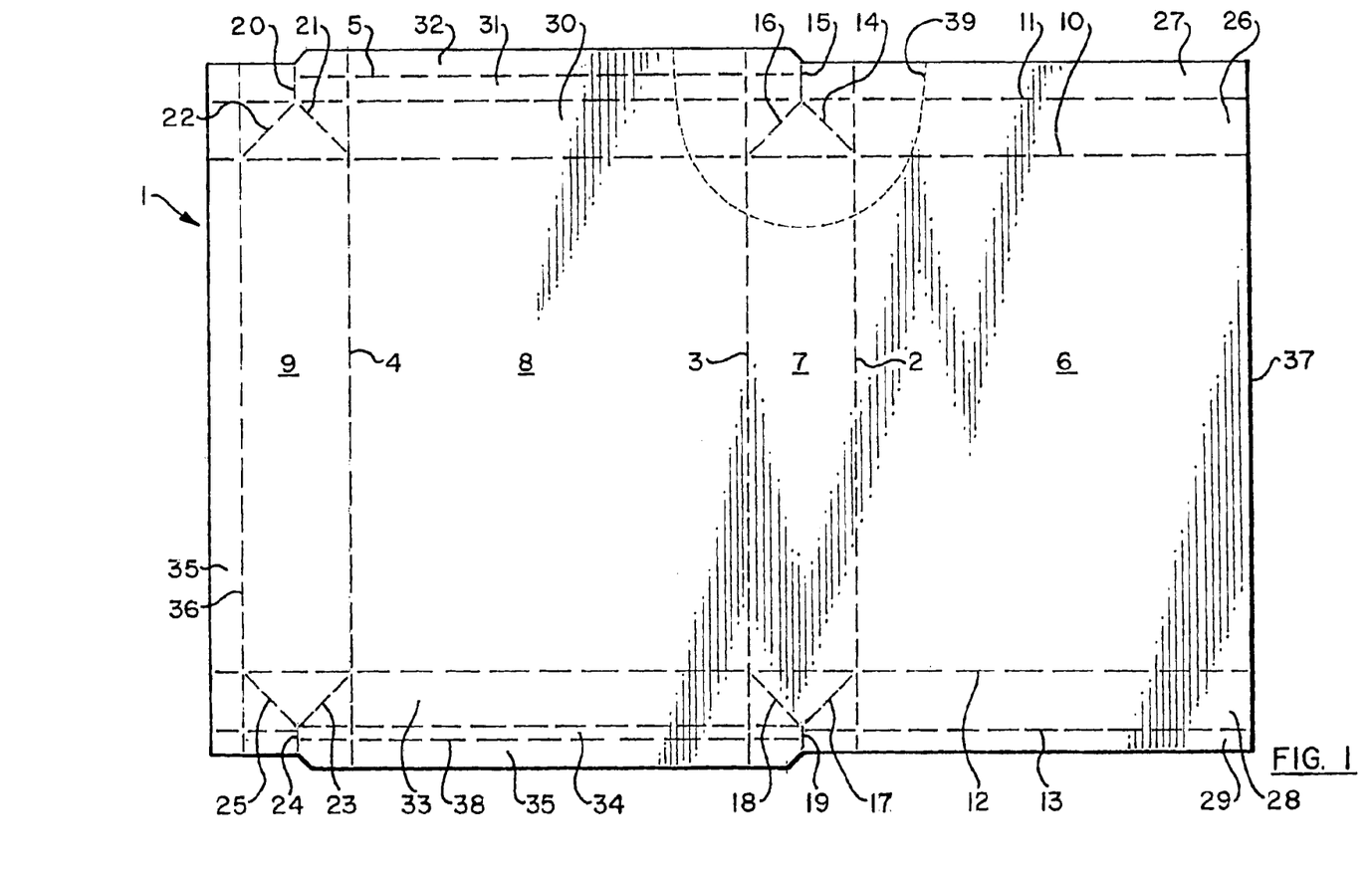
FIG. 1 is a planar representation of a blank used to form the packaging container of the present invention.
Figure 4:
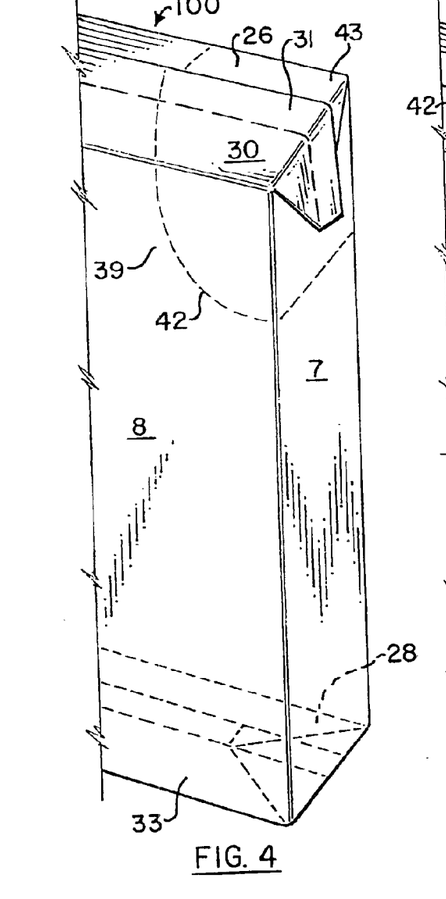
FIG. 4 is a partial isometric view of a container having a linear laser-cut perforated opening according to the invention.
Figure 5:
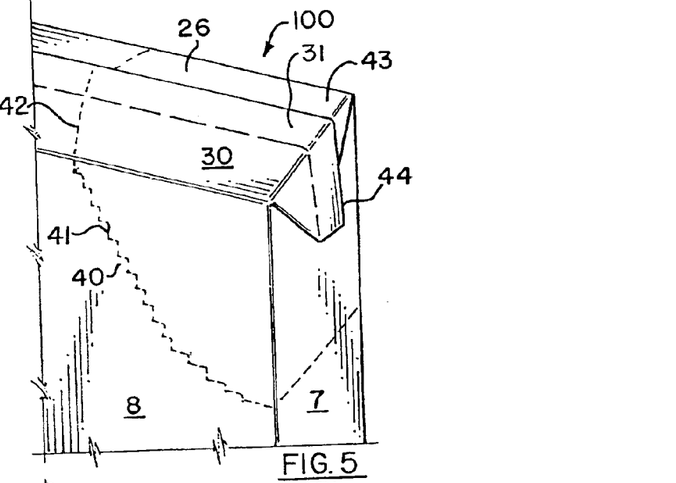
FIG. 5 is a partial isometric view of a container having a jagged laser-cut perforated opening according to the invention.
Figure 6:
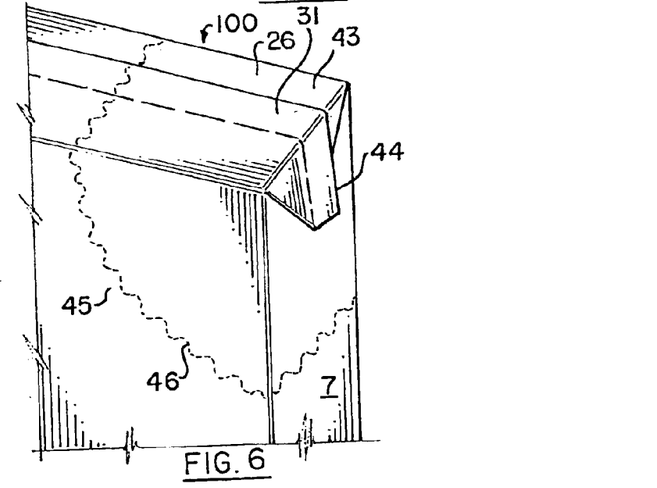
FIG. 6 is a partial isometric view of a staggered, curvilinear laser-cut perforated opening according to the invention.
Figure 7:
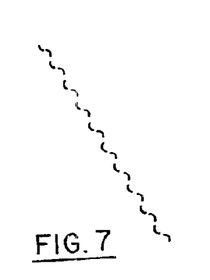
FIG. 7 is a planar representation of a curvilinear laser cut perforation.
Figure 8:
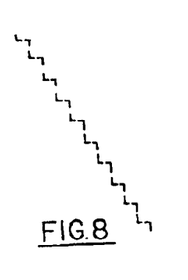
FIG. 8 is a planar representation of a jagged laser cut perforation.
Figure 9:
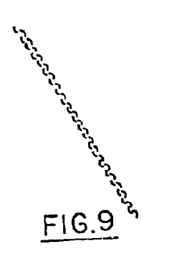
FIG. 9 is a planar representation of a laser cut perforation comprised of series of curvilinear cuts in parallel orientation.
Figure 10:
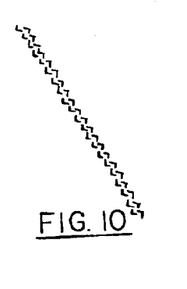
FIG. 10 is a planar representation of a laser cut perforation comprised of series of jagged cuts in parallel orientation.

As is represented by FIG. 1, a blank 1 may be pre-scored with fold lines 2, 3, 4 and 36 according to the desired dimensions of the front, rear and side panels, 6, 7, 8 and 9, respectively. In addition, the blank 1 may be further scored with fold lines 5, 10 and 11, which, when folded, form the top panels of the box; and fold lines 12, 13 and 38, which fold to form the bottom panel of the box. The front panel 6 further comprises a free vertical edge 37. The second side panel 9 preferably further comprises a flange 35, which is foldably connected via score line 36 to the second side panel 9. The blank 1 may further be scored with additional fold lines 14–25, which, may be folded to form the corners of the box. The incorporation of the fold lines 2–4, 10–13 and 36, effectively divides the blank 1 into a front panel 6, a rear panel 8, a first side panel 7 and a second side panel 9, which correspond to the front rear and side panels of the formed box. The blank 1 is further integrally comprised of upper extension portions 26 and 27, and lower extension portions 28 and 29 of front panel 6; and upper extension portions 30, 31 and 32, and lower extension portions 33, 34 and 35 of rear panel 8. The blank 1 may be laser-cut, using a suitable cutting means, to provide a perforation 39 across at least a portion of front panel 6, first side panel 7 and rear panel 8. The perforation 39 forms an easily severable tear line along which the packaging may be opened. The perforation 39 is comprised of spaced cuts formed using a laser-cutting device. As shown in FIG. 4, the cuts may be linear cuts 42 spatially arranged in linear fashion. Alternatively, the perforation may be formed from one or more series of spaced jagged or curvilinear cuts, or any combination of linear, jagged or curvilinear cuts. FIG. 5 shows a box having a laser cut perforation 40, which includes a combination of jagged cuts 41 and linear cuts 42. In this regard, the jagged cuts 41 are incorporated across the rear panel 8 and front panel (not shown) such that the cuts in each of the front and rear panel are, symmetrical in relation to each other, while linear cuts 42 are positioned in the region of the first side panel 7 and the top panel 43. In this regard, the box may be constructed to provide more burst resistance along the front and rear panels, which are typically more susceptible to compression resulting in burst damage. The use of non-linear cuts may provide greater resistance to compression related burst damage. In this regard, the cuts may be implemented through various cut designs, including those shown in FIGS. 7–10. FIG. 7 shows curvilinear cuts in alternating orientation. FIG. 8 shows jagged cuts in alternating orientation. FIG. 9 shows parallel series of curvilinear cuts in staggered alternating orientation. FIG. 10 shows parallel series of jagged cuts in staggered alternating orientation.

If the container is to provide barrier properties, the laser cuts are of a depth sufficient to enable tearing of the opening while avoiding perforation of the barrier layer. Not penetrating the inner surface layer may, however, reduce the ease of tearing open the perforations, and, accordingly, it is desirable to use a combination of perforating means and laminated material that provides a clean break-away of the inner surface layer when the container is opened. The number, length and depth of the cuts may be varied depending on the strength of the substrate, the durability required of the container and the desired ease of tearing the pullout opening. The length of the cuts may be varied to reduce the amount of tearing that is required to open the perforations, thus resulting in a break away area that is easier to pull out.

Figures 2, 3:
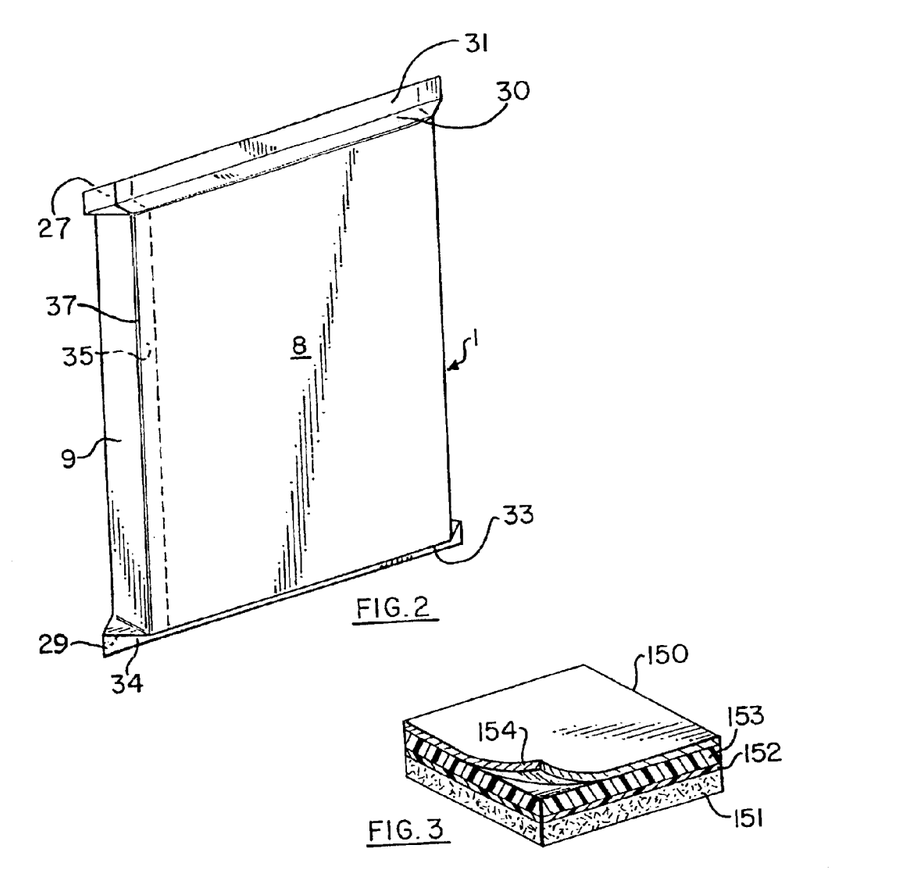
FIG. 2 is an isometric view of a partially formed box made with fin seals according to the invention.
FIG. 3 is a three dimensional view of a laminated substrate used to form the packaging container of the invention.

According to the method of the invention, the box 100 may be partially formed by folding the blank 1, along score lines 2, 3, 4 and 36, then affixing the flange 35 to the inside of the free vertical edge 37 to form a rectangular tube. The flange may optionally be skived to form a hermetic seam. The tube may then be closed at the lower end, by affixing together the inner surfaces of extensions 29 and 34 to form a fin seal 44a, and affixing the inner surface of extension 35 and outer surface of extension 29 flush against the outer surface of extension 28. The non-liquid material to be packaged is then placed inside the cavity and the package sealed by heat sealing together the inner surfaces of extensions 27 and 31 to form fin seal 44b, and affixing the inner surface of extension 32 and outer surface of extension 27 flush against the outer surface of extension 26, as is shown in FIG. 4. FIG. 2 shows a partially formed box with a side seam formed by heat sealing of the flange 35 to the inner edge 37 of panel 8, and seals at each end formed by heat-sealing extensions 27 and 31 and 29 and 34, respectively. The means of sealing the flange 35 or the extensions 27, 29, 31–32 and 34–35 may be selected from any appropriate means known in the art, for example by heat-sealing, ultrasonic welding or applying an adhesive. In the heat-sealing process, a layer of a heat sealable material, which has been previously applied to the internal surface of the blank 1, is heated to a temperature at which it is semi-fluid, or tacky. The tacky surfaces are then compressed together such that the heat sealable material on the surfaces fuses to form a seal.

The blank for forming the box may be comprised of multiple layers laminated together to form a substrate. For packaging food or other sensitive material, the laminated substrate preferably provides moisture vapor and/or oxygen barrier properties to the packaging container after it has been filled and sealed and before it has been opened. As shown in the embodiment of FIG. 3, the substrate 150 is comprised of a paperboard stock layer 151, for example a 16-point solid bleached sulfate (SBS) paperboard manufactured by Westvaco Corporation, and further comprising a polyethylene (PE) film layer 152, at least one layer of a metallized polyester barrier material 153, and a heat-sealable PE contact layer 154. The thickness of each of these layers may be varied depending on the characteristics desired in the substrate. In various embodiments, the outer surface of the substrate may be coated for printing, or it may be left uncoated, depending on the type of substrate used and the intended application for the container.

Figures 11, 12:
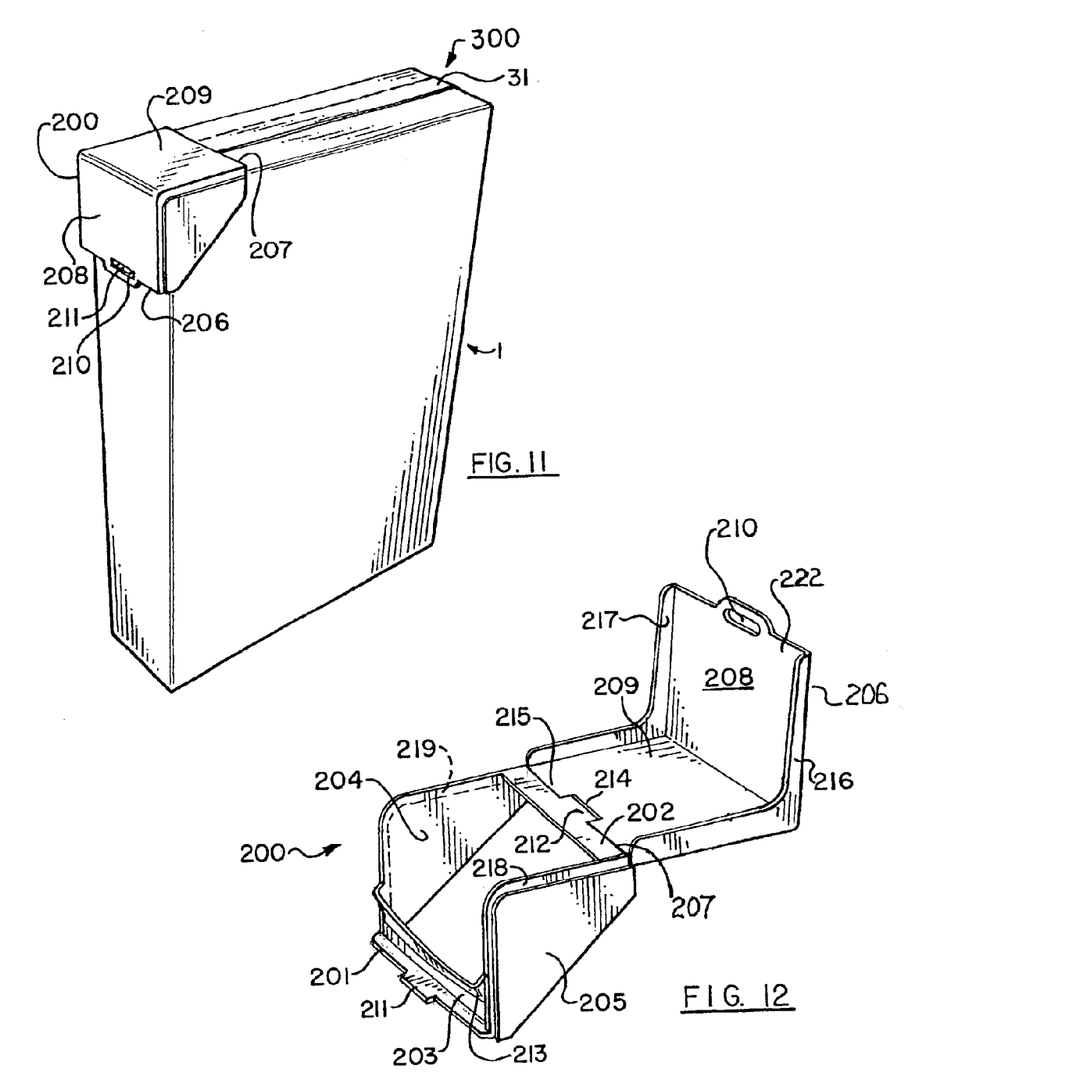
FIG. 11 is a three dimensional view of a packaging container comprising an attached reclosable, locking fitment according to the invention.
FIG. 12 is a view of a reclosable, locking fitment according to the invention.

As shown in the preferred embodiment represented by FIG. 11, the reclosable locking container comprises a box 1 equipped with a locking, reclosable fitment 200, which provides a reclosable locking means for pouring material out of the container and then fastenably securing the opening. As shown in FIG. 12, the fitment 200 comprises a frame 201, having an upper rim 202, a lower rim 203 positioned opposite to the upper rim 202, said lower rim having an outwardly flanged lip 213 to provide support to the lid portion 208 during closing, and opposing side rims 204 and 205. Side rims 204 and 205 are of an angular shape to provide perpendicular support to fitment lid 206 in the closed position. The fitment lid 206 is hingedly connected to the upper rim 202 via a hinge element 207, which may be integrally formed with fitment lid 206 and frame 201. Fitment lid 206 is further comprised of two planar portions 208 and 209 fixedly connected to each other at approximately a 90° angle. Fitment lid 206 further includes a locking mechanism for securing the fitment lid 206 in the closed position, comprised of a first slot element 210, appending from a lower fitment lid edge 222, said slot element 210 being engageable over a first tab element 211, which is positioned in direct correspondence to the slot element 210. The fitment lid 206 may be locked in the closed position by applying pressure to the first slot element 210 to engage the first tab element 211 with the first slot element 210. In the closed position, side edges 216 and 217 of the fitment lid are positioned securely over flanges 218 and 219 of the frame 201. Fitment 200 further comprises a second tab element 212 located in the upper frame edge 202, positioned in direct correspondence with a second slot element 214 in the upper fitment lid edge 215. Engagement of the second tab element 212 with the second slot element 214 lockably engages the fitment lid 206 while it is in the fully opened position.

In addition to the preferred embodiments described above, other molded fitments having at least one locking mechanism may be incorporated into the present invention. Such molded fitments preferably comprise a frame and a lid, however they may be of any suitable configuration that provides a reclosable closure means. A suitable molded fitment may therefore, for example, be any molded fitment having a lid that may be hingeably or slidably engaged with the frame.

Figure 13:
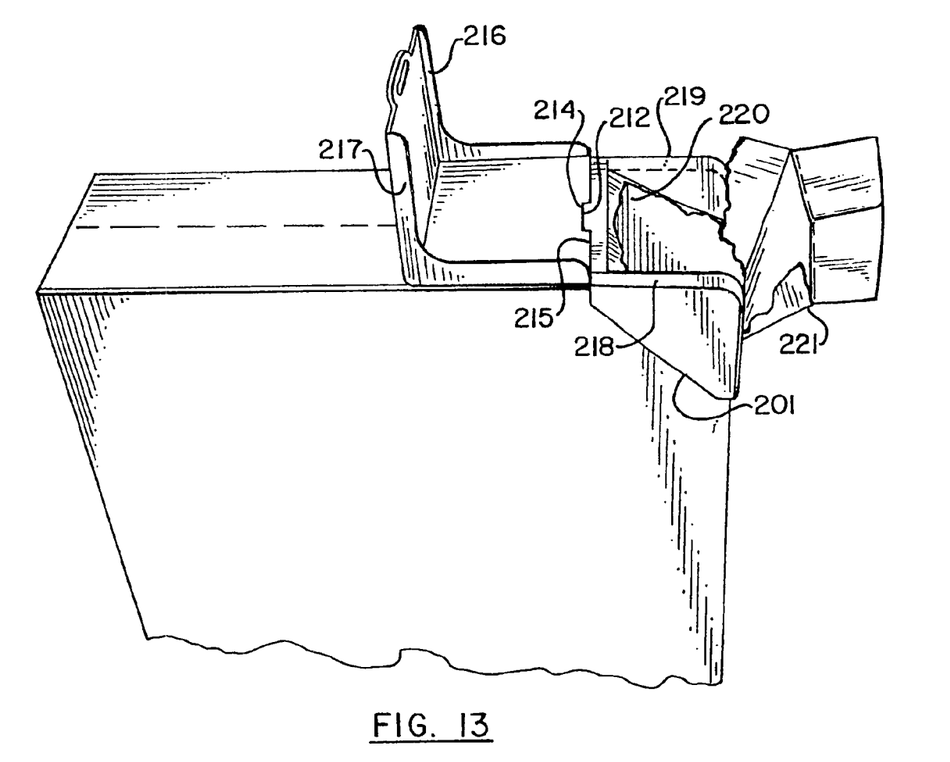
FIG. 13 is a partial view of a container formed according to the invention.

The fitment may be attached to the container body using any suitable adhesive means, such as a hot-melt adhesive, or any other suitable means. As shown in FIG. 13, the fitment frame 201 may be mounted around the periphery of the perforated opening 220 such that after removable tab 221 is torn away to open the package, the opening 220 may be secured by closing and fastening the fitment lid 206.

The packaging container of the invention may be formed as a box suitable for containing a wide range of dry materials, examples of which include, without limitation, foodstuffs, pharmaceutical or cosmetic preparations, non-reactive compositions such as cleaning agents. In particular, where the container is desired for use in the packaging of foodstuffs, such as dry cereal, dried fruits, and other foodstuffs, or other moisture or oxygen-sensitive materials, packaging such materials according to the method of the present invention is effective in reducing the exposure of such materials to environmental degradation agents while the package remains in the sealed condition.

The following examples are representative of, but are in no way limiting as to the scope of the invention.

EXAMPLE I

Oxygen Barrier Properties

The oxygen barrier properties of cereal boxes formed according to the invention were evaluated in comparison to commercially available bagless cartons having an EVOH barrier layer and formed with gable seals at the top opening, and in comparison to conventional bag-in-box cereal containers having a bag made of a PE/EVOH/PE laminate within a paperboard box. Both types of boxes were filled with a dry fruit and cereal mix, and the headspace flushed with nitrogen gas, before sealing. The sealed containers were then stored at ambient conditions, and headspace samples extracted to determine oxygen levels at periodic intervals.

Figure 14:
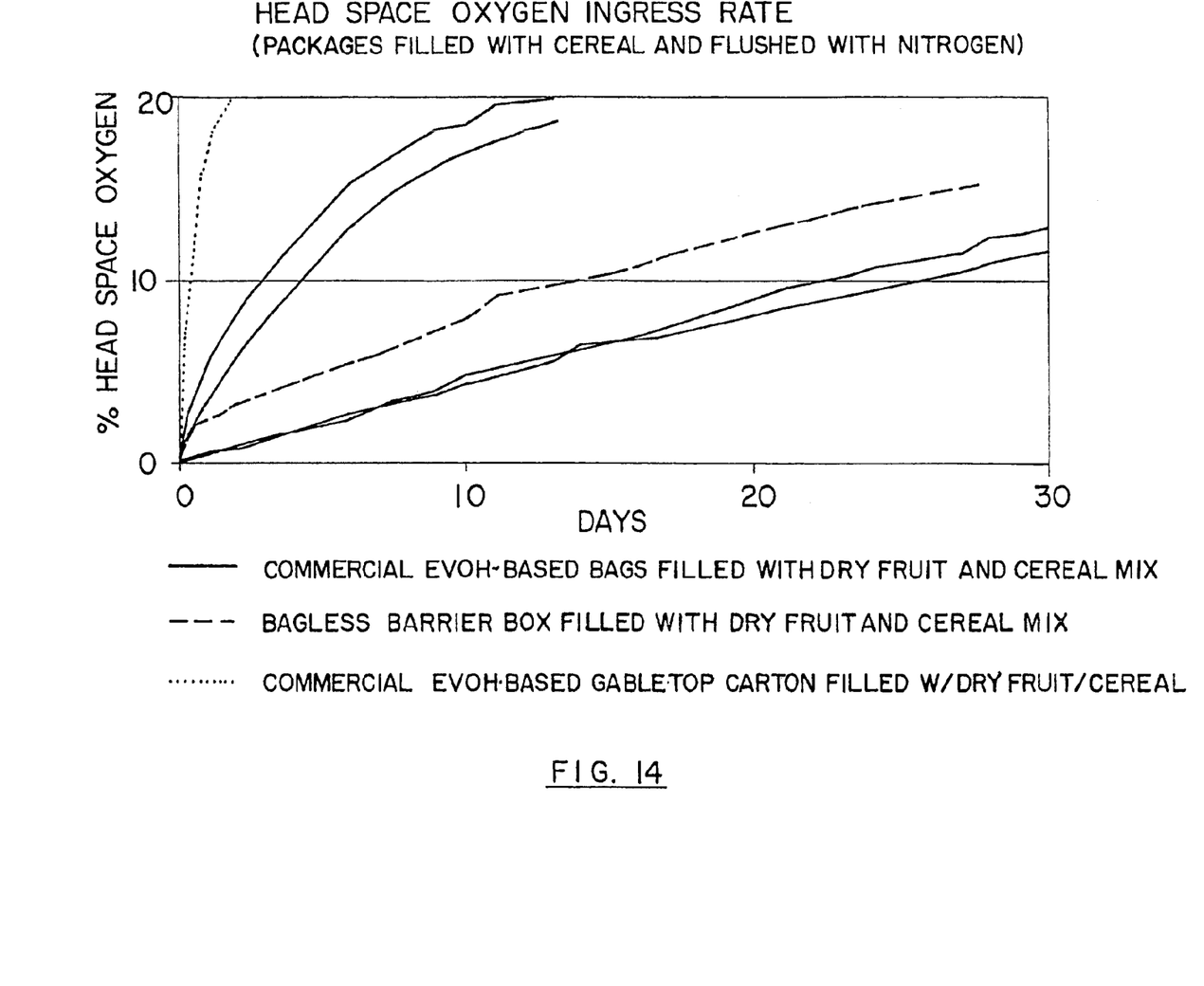
FIG. 14 is a graphical representation showing the oxygen barrier properties of the invention.

It was observed from the results that the bagless gable-top cartons exhibited relatively rapid oxygen ingress; the headspace oxygen level approached 20% within the first 2 days. The bag-in-box combination showed much lower oxygen uptake, with measured headspace oxygen of approximately 13% after 30 days. In relation to these comparative examples, the bagless barrier box of the invention demonstrated a maximum oxygen uptake of about 15% after 27 days, which is a much lower uptake than that observed for the bagless gable-top box. The results of this comparison are graphically represented in FIG. 14.

Example II

Moisture Barrier Properties

The effectiveness of a cereal box formed according to the present invention at preventing moisture absorption was evaluated in comparison to a commercially available EVOH-based bag-in-box combination, where the bag served as the barrier material. The containers were sealed and held at ambient conditions and sampled at periodic intervals to determine the Moisture Vapor Transmission Rate (MVTR) of each package, per 100 square inches of package size. MVTR of the package substrate was determined using a MAS 1000 apparatus, while the MVTR of the entire package was determined by gravimetric analysis and normalized to account for any differences in package size. In the latter test, the package was filled with a desiccant to facilitate consistent moisture absorption during the measurement period. The results are shown below in Table 1.

| Package Type | Substrate MVTR Gm/100 in²/day (machine test) | Package MVTR Gm/100 in²/day (gravimetric test) |
| --- | --- | --- |
| Comparative Sample: EVOH-based bag/paperboard box (no barrier) | 0.15 | 0.17<br>0.12 |
| Bagless barrier container (invention) | 0.06 | 0.1<br>0.06<br>0.03<br>0.04 |

It is believed that the present invention includes many other embodiments that may not be herein described in detail, but would nonetheless be appreciated by those skilled in the art from the disclosures made. Accordingly, this disclosure should not be read as being limited only to the foregoing examples or only to the designated preferred embodiments.

What is claimed is:

1. A container comprising:
   a substrate having a barrier material on one side of said substrate, wherein said substrate is dimensioned and shaped to be folded into a closed container having a front panel, a first side panel, a rear panel and at least one or more fin seal areas; and
   a partially weakened substrate region formed on a side opposite said barrier material and extending across at least said front panel, said first side panel and said rear panel, wherein said weakened region is dimensioned to align with a fitment,
   wherein said substrate is folded into the shape of said container, at least two perimeters of said substrate are fin sealed to each other and a fitment is secured to an outside surface of said container and aligned with said partially weakened region.

2. The container of claim 1 wherein said fitment comprises a frame and a moveable lid secured to said frame.

3. The container of claim 2 wherein said fitment further comprises a first locking means for securing said lid to said frame in a closed position.

4. The container of claim 2 wherein said fitment further comprises a second locking means for retaining said lid in an open position relative to said frame.

5. The container of claim 1 further comprising a skived side seam.

6. The container of claim 2 wherein said lid is hingedly connected to said frame.

7. The container of claim 3 wherein said first locking means of said fitment is comprised of a first tab element located on said frame and in alignment with a first slot element located on said lid.

8. The container of claim 4 wherein said second locking means is a second tab element located on said frame and aligned with a said lid so that said lid is retained in an open position when a surface of the lid extends behind said second tab.

9. The container of claim 8 wherein said lid further comprises a second slot aligned with said second tab element.

10. The container of claim 2 wherein said frame and said lid are molded from plastic.

11. The container of claim 2 wherein a perimeter of said frame and a perimeter of said lid are beveled so that at least some portion of said lid extends beyond the perimeter of said frame to form a close fit between said lid and said frame.

12. The container of claim 1 wherein said partially weakened region is formed at a top corner of said container.

13. The container of claim 2 wherein said container is opened by moving said lid to an open position and removing at least some portion of said container in the general vicinity of said partially weakened substrate region.

14. The container of claim 13 further comprising a skived side seam.

15. The container blank of claim 1 wherein the barrier material is selected from the group consisting of metallized polyester, metallized polypropylene, metallized oriented polypropylene, metallized biaxially oriented polypropylene, PVDC-coated polypropylene, ethylene vinyl alcohol, nylon, aluminum foil and combinations thereof.

16. The container blank of claim 1 wherein said container substrate is selected from the group consisting of solid bleached sulfate (SBS) paperboard, clay-coated newsback (CCNB), coated solid unbleached sulfate (SUS), multi-ply folding box board, kraft paperboard, polymeric materials and any combination thereof.

* * * * *